C. R. PIEPER.
SHAFT HANGER.
APPLICATION FILED JULY 1, 1918.
1,306,623.
Patented June 10, 1919.
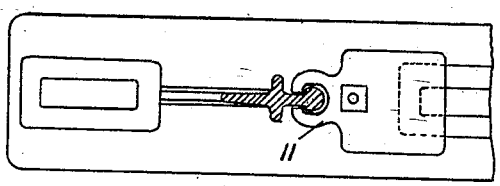
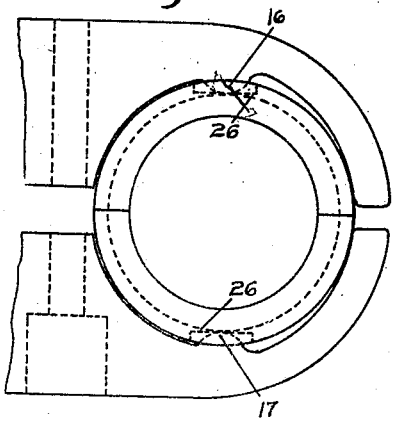
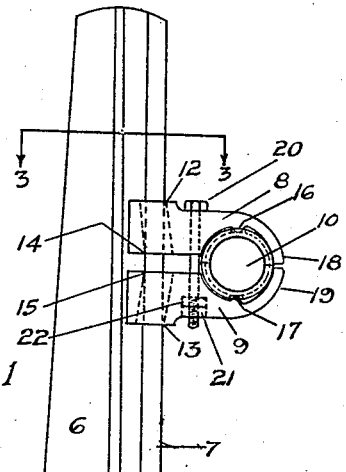
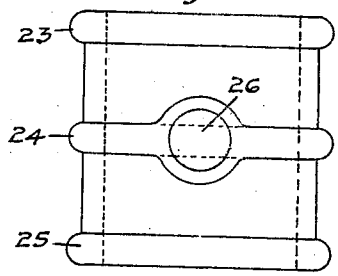
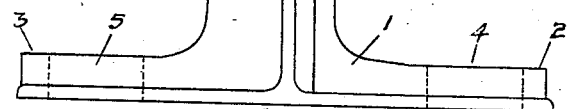
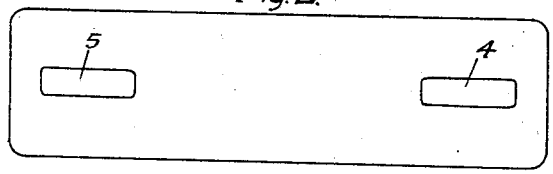
Inventor
Chester R. Pieper.
By C. D. Enochs
Attorney.

UNITED STATES PATENT OFFICE.

CHESTER R. PIEPER, OF LA CROSSE, WISCONSIN, ASSIGNOR TO GUND MANUFACTURING COMPANY, OF LA CROSSE, WISCONSIN, A CORPORATION OF WISCONSIN.

SHAFT-HANGER.

1,306,623.

Specification of Letters Patent.

Patented June 10, 1919.

Application filed July 1, 1918. Serial No. 242,913.

*To all whom it may concern:*

Be it known that I, CHESTER R. PIEPER, a citizen of the United States, and a resident of La Crosse, in the county of La Crosse and State of Wisconsin, have invented certain new and useful Improvements in Shaft-Hangers, of which the following is a specification.

The purpose of this invention is to provide a shaft hanger that will give all necessary adjustments and that can be completed in the foundry requiring no machine work.

One of the objects of the invention is to provide, in a shaft hanger, a pedestal, and improved means for attaching a bearing thereto.

Another object of my invention is to provide in combination with a pedestal and a bearing, a gripping means that will positively grip the bearing and the pedestal.

With these and incidental objects in view, the invention consists of certain novel features of construction and combination of parts, the essential elements of which are hereinafter described with reference to the drawing which accompanies and forms a part of this specification.

In the drawing Figure 1 is a side elevation of my improved hanger. Fig. 2 is a bottom view of the pedestal. Fig. 3 is a section taken on the line 3—3, Fig. 1. Fig. 4 is an enlarged side elevation of the bearing clamp. Fig. 5 is a plan view of the bearing, and Fig. 6 is an end view of the same.

The pedestal base 1 has bosses 2 and 3 with slotted apertures 4 and 5 therein, through which bolts or lag screws may be passed to support the pedestal, the slots providing adjustment means, and the pedestal base carries an extension 6 with general cross shaped section, as shown in Fig. 3, and having a rib 7 extending along one of its edges.

A clamping member, consisting of two halves 8 and 9, carries the bearing 10.

Each of the half sections has an extension 11 of general reversed C shape to pass over and engage with the rib 7, as plainly shown in Fig. 3.

As shown in Fig. 1 the interior of this extension provides a bearing point 12 in the upper half and 13 in the half on the exterior of the rib 7 and bearing points 14 and 15 respectively on the interior of the rib 7.

Bosses 16 and 17, respectively, on the upper and lower halves, provide pressure means for holding the split bearing 10, and the two lips 18 and 19 partly encircle the split bearing for protection and guidance.

Each of the halves of the clamp has apertures extending therethrough for receiving a clamping bolt 20, the lower half having a squared recess 21 for receiving and locking the nuts 22 to prevent its turning when the bolt is drawn up.

The bearings are preferably provided with ribs 23, 24, and 25, Fig. 5, the ribs 24 having recesses 26 for receiving the bosses 16 and 17, these bosses preferably being of a ball shape so as to present practically a single point of contact.

Looking at the assembled bearing clamp and extension shown in Fig. 1, it is evident that when the bolt 20 is drawn tight a pressure is set up on the two halves of the bearing by the bosses 16 and 17, and that the two halves of the clamp then swing about these bosses until the points 12 and 13 rest snugly against the exterior of the rib 7, and the interior bearing points 14 and 15 are tightly pressed against the inside edge of the rib 7.

This construction provides an extremely strong, rigid support for the bearing and at the same time is quickly and easily adjusted as it is only necessary to loosen the bolt 20 in order to slide the clamp longitudinally of the rib 7 to whatever position it should assume, and as the slots 4 and 5 provide transverse adjustment of the hanger, the bearing may be quickly positioned for supporting the shaft, and as the clamp, as well as the pedestal, is finished as it comes from the foundry, the resultant shaft hanger is of extremely low first cost as well as being complete and satisfactory in every respect.

While I have described my invention and illustrated it in one particular design, I do not wish it understood that I limit myself to this construction, as it is evident that the application of the invention may be varied in many ways within the scope of the following claims.

Claims:

1. In a shaft hanger the combination of a base having slotted mounting holes therein, a pedestal extending from said base of general cross shaped section and having a rib extending along one of its edges, a bearing support clamp having a reversed C shaped extension to engage over said rib and be slidably adjustable thereon, and means for locking said clamp at any desired position on said rib.

2. In a shaft hanger the combination with a pedestal having a flange extending longitudinally and an enlarged rib extending longitudinally of said flange, of a two piece clamp, each of the members thereof having an engagement member to be slidably mounted over said rib, means for lining a bearing in said clamp, and means for drawing the rib engaging ends of said clamp toward each other, thereby binding said clamp to said rib.

3. In a shaft hanger the combination with a pedestal having a rib extending along one edge thereof, of a two piece clamp, each member of which has engagement means for engaging with said rib, means for receiving a bearing carried by said clamp, the rib engaging means of the two members of said clamp being so fashioned as to provide substantially a three point clamping contact on said rib when the two halves of said clamp are drawn toward each other.

CHESTER R. PIEPER.

Copies of this patent may be obtained for five cents each, by addressing the "Commissioner of Patents, Washington, D. C."